J. G. MARIS.
Car-Coupling.

No. 208,188.  Patented Sept. 17, 1878.

WITNESSES
Fred G. Dieterich
Geo. Birkenburg

INVENTOR
Joseph G. Maris
per John S. Cox
by Louis Bagger & Co.
Associate ATTORNEYS.

UNITED STATES PATENT OFFICE.

JOSEPH G. MARIS, OF WYANDOTTE, KANSAS.

IMPROVEMENT IN CAR-COUPLINGS.

Specification forming part of Letters Patent No. 208,188, dated September 17, 1878; application filed February 19, 1878.

*To all whom it may concern:*

Be it known that I, JOSEPH G. MARIS, of the city of Wyandotte, county of Wyandotte, and State of Kansas, have invented a new and useful Improvement in Car-Couplers; and I do hereby declare that the following is a full and exact description thereof, reference being had to the accompanying drawings, and to the letters of reference marked thereon, making a part of this specification, of which—

Figure 1:
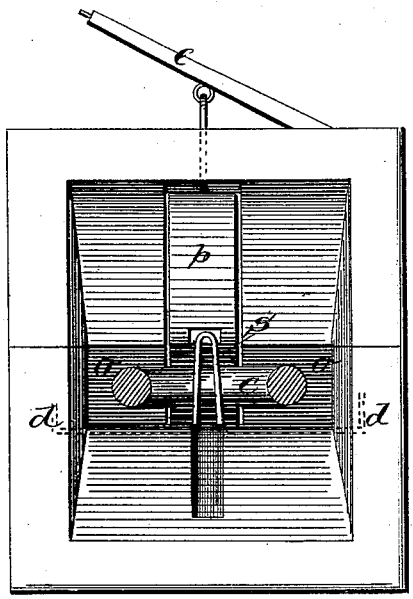
Figure 2:
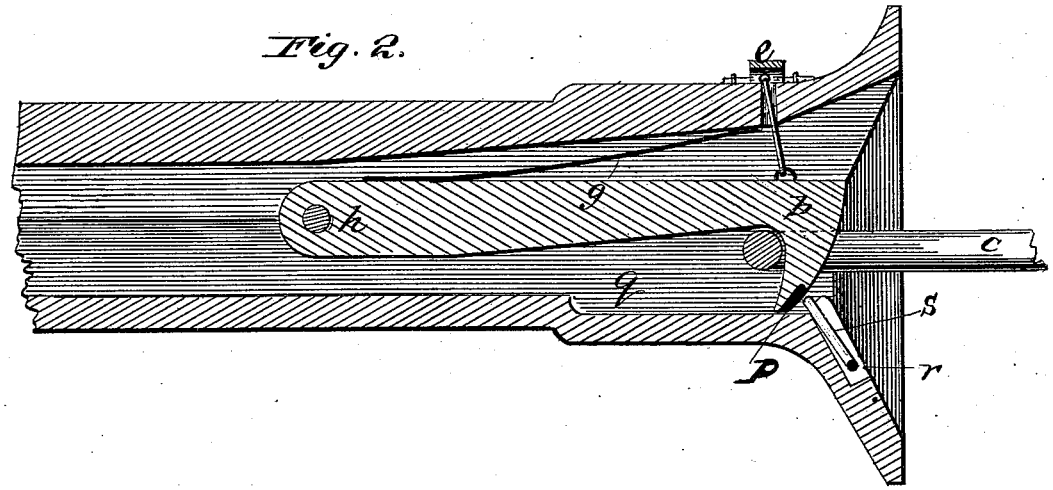

Figure 1 is a front view, and Fig. 2 is a vertical longitudinal section, of my improved car-coupling.

I provide a draw-head, which is externally similar to the one now common in use, as shown in Fig. 2, with an aperture or cavity, $o$ $o$, as seen in Figs. 1 and 2, extending far enough back and of sufficient capacity to receive a hook of size and strength desired. I make the lower half of this cavity $o$ $o$ of sufficient width in front to receive the link $c$ far enough to give sufficient play, where I narrow it down to the desired size of the hook $b$, as seen in Fig. 1. I sink or depress the floor of the larger part of the cavity $o$ $o$ about one inch, more or less, as desired or size demands, below the rear or smaller part, but raise it to a level and form an apex immediately in front of the hook $b$, from which I form the slope or funnel to the mouth of the draw-head, as seen in Fig. 2. I make the upper half of cavity $o$ $o$ of the same width throughout, as shown in Fig. 2, with a semicircular depression or concave, $q$, of about two inches, more or less, as size demands, extending back from bolt-hole, and corresponding with lower half. The roof of cavity $o$ $o$ rises from rear to front, as shown in Fig. 2, sufficient to give the necessary perpendicular play to the hook $b$. The hook, with spring $g$ attached, being inserted in the cavity, is securely fastened by bolt $h$, (any common flat or spiral spring being used.) The mouth of draw-head is flared or funnel-shaped; the outer end of the hook beveled. The rod $d$, to which frog S is attached, passes through the draw-head, as shown in Fig. 1, and lies on the bottom of the cavity, and immediately under the niche P in the hook. The frog S lies in the slot $r$, made to receive it. I use the common link, which is held out horizontal, not drooping.

The coupling is performed by the pressure of the link against the point of the hook, causing it to rise. The link passes back, and is immediately and securely caught by the hook, thus performing its own coupling, which is always safe, sure, and certain, and may be done by the engineer alone, who can couple a whole train of any number of cars in the shortest possible time and without leaving his engine, thus avoiding the expense, delay, and danger consequent in the ordinary mode of coupling. I uncouple by raising the lever $e$, which may be done from the platform, or from the top of the car, by means of chain or other suitable means.

The frog is used to cut a standing train. I raise the lever $e$, turn up the frog S by the handle $d$ until it catches in the niche P, as seen in Fig. 1—the engine moves, the link draws out, the frog falls in the slot $r$, and the hook drops to its place ready for the next coupling.

What I claim as my invention, and desire to secure by Letters Patent, is—

In a car-coupling, the combination, with the coupling-hook $b$, of the frog S, for holding the forward end of said hook in an elevated position in uncoupling the cars, substantially as and for the purpose set forth.

JOSEPH G. MARIS.

Witnesses:
 W. J. BUCHAN,
 J. S. CLARK.